United States Patent [19]

Jordhamo

[11] Patent Number: 5,547,396
[45] Date of Patent: Aug. 20, 1996

[54] USE OF SEMI-INTERPENETRATING POLYMER NETWORKS FOR CABLE/FIBER RETENTION

[75] Inventor: George M. Jordhamo, Wappingers Falls, N.Y.

[73] Assignee: International Business Machines Corporation, Armonk, N.Y.

[21] Appl. No.: 319,180

[22] Filed: Oct. 4, 1994

[51] Int. Cl.$^6$ ................................................ H01R 13/58
[52] U.S. Cl. ......................... 439/604; 439/936; 439/460; 439/736
[58] Field of Search ........................... 439/604, 936, 439/204, 460, 736, 449, 452, 474; 29/446, 447, 448, 449, 450, 451; 264/26

[56] References Cited

U.S. PATENT DOCUMENTS

| | | | |
|---|---|---|---|
| 1,601,255 | 10/1924 | Marra | 439/460 |
| 3,739,320 | 6/1973 | Flanagan | 339/103 |
| 4,033,535 | 7/1977 | Moran | 248/56 |
| 4,077,692 | 3/1978 | Ellis | 339/103 |
| 4,082,422 | 4/1978 | Kloots | 350/96 |
| 4,083,902 | 4/1978 | Clyde | 264/26 |
| 4,264,128 | 4/1981 | Young | 350/965 |
| 4,272,645 | 6/1981 | Kornatowski | 174/65 |
| 4,425,292 | 1/1984 | Kanotz | 264/174 |
| 4,984,865 | 1/1991 | Lee | 350/96 |
| 5,030,135 | 7/1991 | Plesinger | 439/447 |

Primary Examiner—P. Austin Bradley
Assistant Examiner—Yong Kim
Attorney, Agent, or Firm—Lily Neff

[57] ABSTRACT

A device and a method which utilizes semi-interpenetrating polymer networks for strain relief of fiber or cable. The need for adhesives and mechanical means for cable or fiber retention is eliminated while performance and reliability is enhanced. In one embodiment a first polymer network is fabricated in an undersized plug which is in turn placed inside a hollow connector housing with an open end and at least one aperture for a cable to pass through. The void created between the plug and the connector shell is then subsequently filled by adding a second polymer to fill the unit. The unit is then placed in a curing chamber so that the polymer can swell and completely fill any voids between the plug and the connector shell.

11 Claims, 3 Drawing Sheets

5,547,396

USE OF SEMI-INTERPENETRATING POLYMER NETWORKS FOR CABLE/FIBER RETENTION

FIELD OF THE INVENTION

This invention relates to the use of semi-interpenetrating polymer networks for electrical cable or optical fiber strain relieve.

BACKGROUND OF THE INVENTION

In both electrical and fiber optic connectors, strain relief is utilized to eliminate or reduce axial stress on the fiber or cable contact interface. This is usually accomplished with the use of an adhesive in fiber optic connectors or by mechanical means in electrical connectors. In both of those cases, the methods utilized for strain relief can lead to performance degradation and reliability exposure. For example, high speed cables use foamed polytetra fluoro ethylene (PTFE) as the primary dielectric. In order to strain relieve the connector, two mating halves are compressed together, crushing the inner foam dielectric. This leads to a change in the dielectric constant of the material resulting in a reduction in signal speed.

In the case of fiber optic connectors, many fiber optic cables utilize an adhesive such as epoxy to strain relieve the fiber. However, if bubbles are present in the adhesive, excessive stress can be caused in the fiber which ultimately leads to latent fiber fracture in the field. Therefore there is a need for a uniform, void free method of fiber or wire strain relief.

OTHER PATENTS RELATING TO THE FIELD OF INVENTION

U.S. Pat. No. 4,264,128 apparently teaches a molded optical connector in which a filler material is inserted in portions of a molded cavity not filled by an earlier positioned insert. There are no teachings or suggestions to use a semi-interpenetrating polymer network.

U.S. Pat. No. 4,425,292 appears to teach a hybrid extrusion method similar to U.S. Pat. No. 4,264,128. Again there are no teachings or suggestions to use a semi-interpenetrating polymers.

U.S. Pat. No. 5,030,135 apparently teaches a cable strain device designed for attachment to an electrical cable end portion to resiliently resist both torsional and transverse bending loads imposed on the cable end portion. The disclosure stresses a method of strain relief based on a particular manner of construction, such that torsional and transverse bending loads are present in a progressive generally linear fashion. No mention of semi-interpenetrating polymers is made.

U.S. Pat. No. 3,739,320 appears to disclose apparatus and method for a strain relief mechanism which is integrally formed during the fabrication of the component to secure the wiring against linear movement.

U.S. Pat. No. 4,272,645 discusses the use of an elasteromeric material to reduce strain relief, and U.S. Pat. Nos. 4,984,865 and 4,077,692 discuss adhesive thermoplastic and bonding methods respectively which are used for strain relieved fiber optic cables. Neither of the above-mentioned patents teach or suggest a semi-interpenetrating polymer network used for strain relieving cables or fibers.

U.S. Pat. No. 4,033,535 appears to teach an apparatus and a method for manufacturing a permanently lockable, strain relief bushing and a tool for applying the same in an aperture in a support panel.

SUMMARY OF THE INVENTION

Accordingly, an object of the present invention is to provide an apparatus and a method using semi-interpenetrating polymer networks for cable or fiber strain relief.

Another object of the present invention is to use semi-interpenetrating polymer networks for cable strain relieve without damage to soft internal dielectrics.

Still another object of the present invention is to use semi-interpenetrating polymer networks to provide void-free fiber strain relief in optical fiber connectors.

Yet another object of the present invention is to use semi-interpenetrating polymer network strain relief to eliminate need for additional plugs.

Still another object of the present invention is utilization of semi-interpenetrating polymer networks in which electrically conductive connector plugs are utilized as a first polymer network such that when it is swelled by the addition of a second monomer, electrical continuity is achieved.

To achieve the above-mentioned objects, in one embodiment of the invention a device and method for the same is described which utilizing semi-interpenetrating polymer networks for strain relief. In this embodiment, a first polymer network is fabricated in an undersized plug. A polymer plug is then placed in a connector housing with a hollow center having an open end and also having another end with at least one aperture for cabling to pass through. The plug is undersized, and hence an initial void remains between the plug and the connector housing. A monomer containing an initiator is then applied to the center of the connector housing and also contains the plug, so that the void remaining between the connector housing and the plug is completely filled when the plug swells, after the assembly is placed in a curing chamber.

BRIEF DESCRIPTION OF THE DRAWINGS

The subject matter which is regarded as the invention is particularly pointed out and distinctly claimed in the concluding portion of the specification. The invention, however, both as to organization and method of practice, together with further objects and advantages thereof, may best be understood by reference to the following description taken in connection with the accompanying drawings in which:

DETAILED DESCRIPTION OF THE INVENTION

Figure 1A:
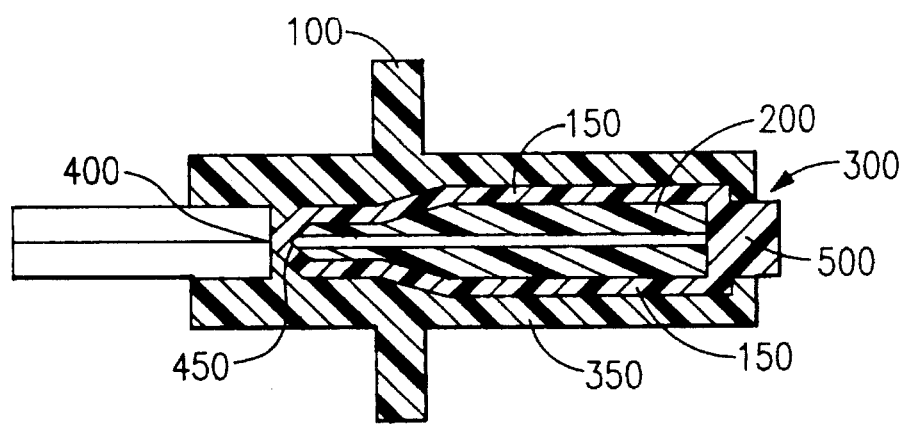
FIG. 1A is a partially cut-away side view of an embodiment of the invention showing the connector housing and an undersized plug inside the connector housing before the plug has swelled.

FIGS. 1 and 2 show one embodiment of the present invention. In FIG. 1A, prefabricated polymer plug 200 is used to form a semi-interpenetrating polymer network (S-IPN). The polymer plug 200 is designed to fit into connector cavity 300 of a connector housing 100 such that polymer plug 200 does not contact interior walls 150 of the connector housing, i.e., the plug is undersized. In addition, both connector housing 100 and polymer plug 200 contain opening 400 and 450 respectively, so that wires or fibers to be strain relieved can pass through polymer plug 200. Polymer plug 200 is preferably manufactured from an elastomeric material which is relatively flexible. The elastomer is to be crosslinked and the exact type is not critical as long as it is compatible with the swelling monomer (i.e., as long as it will be swelled by the monomer). Some examples are neoprene, nitrile, ethylene propylene diene monomer (EPDM), silicones, to name a few.

Once connector housing 100 is assembled the undersized polymer plug 200 in place, monomer 500 is added to connector housing 100 such that the polymer plug 200 will be immersed in monomer 500. Monomer 500 is premixed with a curing agent so that when required, it can be cured to form it's own crosslinked structure. Monomer 500 can be added by syringe locally into the connector housing 100 or fixtures may be utilized so that the housing portion 100 is wetted by the monomer upon immersion into a reservoir containing the monomer.

Due to the swelling characteristics between the monomer 500 and polymer plug 200, polymer plug 200 is saturated with monomer 500, at the same time increasing in size due to monomer 500. As polymer plug 200 increases in size, the dimensions of the plug change and the void area between polymer plug 200 and inside walls 150 of connector housing 100 is reduced in size. Once the entire void area 350 is filled, monomer 500 is cured by one of many possible curing techniques, such as by UV energy or by heat, until it will form a three dimensional crosslinked structure, either with or without the addition of a crosslinking agent, depending on the monomer material utilized. The monomer 500 may be of many types, as long as it will swell the polymer plug 200. Some common monomer types are styrene or methacrylate monomers.

Figure 1B:
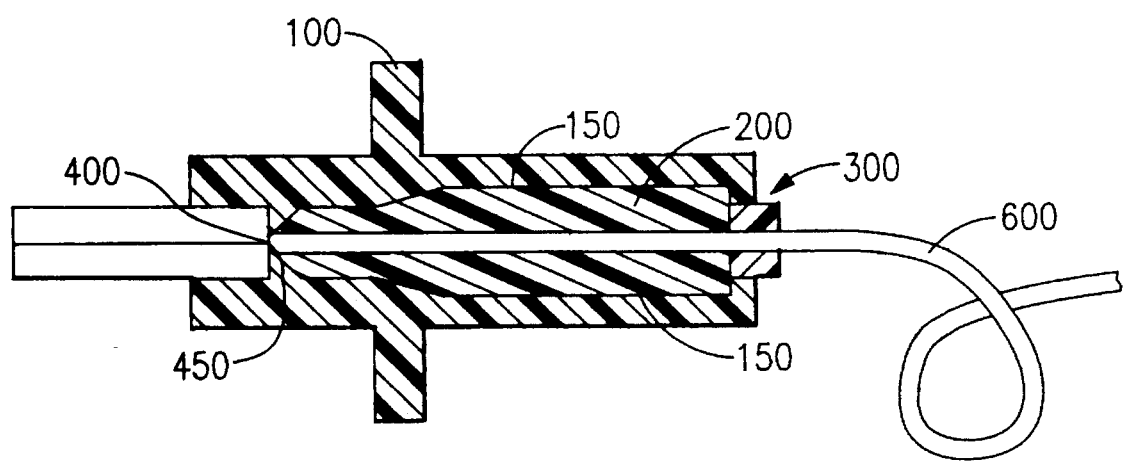
FIG. 1B is a view of the same assembly as in FIG. 1A, but after the polymer plug has swelled and increased in size to make contact with the connector housing.

Once monomer 500 is cured, the size of plug 200 remains constant. Plug 200 now fills the entire connector cavity, as shown in FIG. 1B. Polymer plug 200 is in contact with the inner walls 150 of connector cavity 300 as well as in contact with the outer surfaces of wire or fiber 600. At this point, the wires or fiber 600 are now suitably strain relieved from axial pulls on the wire or fiber. In this embodiment, a rigid monomer is preferably chosen so that the initially flexible polymer plug is now a rigid mass, occupying the entire connector cavity.

FIG. 2 shows an alternate embodiment of the invention used for stress relieve of a wire in electrical applications.

Figure 2A:
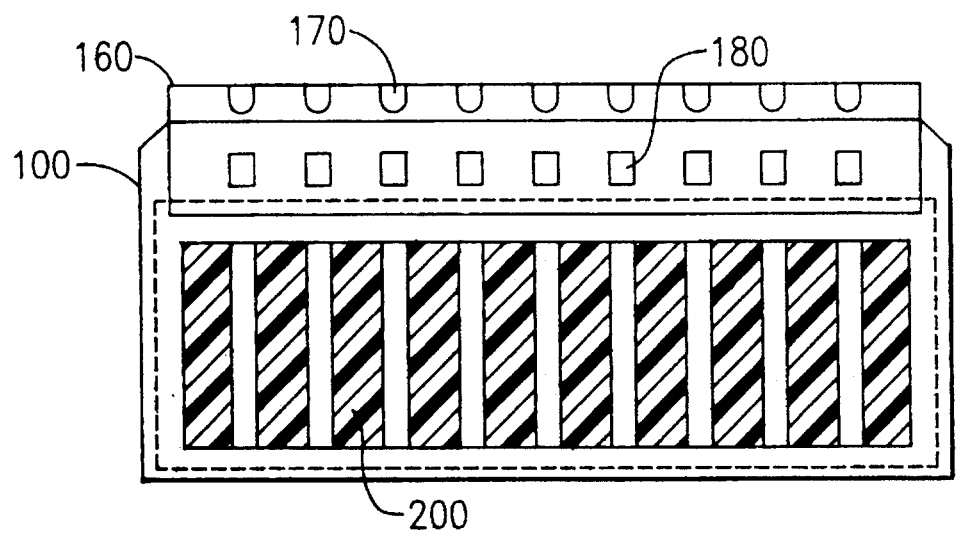
FIG. 2A illustrates an alternative embodiment of the present invention showing an electrical connector with a polymer plug in an edge connector assembly before the cables have been inserted and the plug is cured.

FIG. 2A is similar to FIG. 1A and shows an assembly before polymer plug 200 is swelled. Connector housing 100 in FIG. 2A contains edge connector 160, points of electrical contact 170, and a bonding pad 180. Polymer plug 200 used in this assembly is a multi-orifice plug.

Figure 2B:
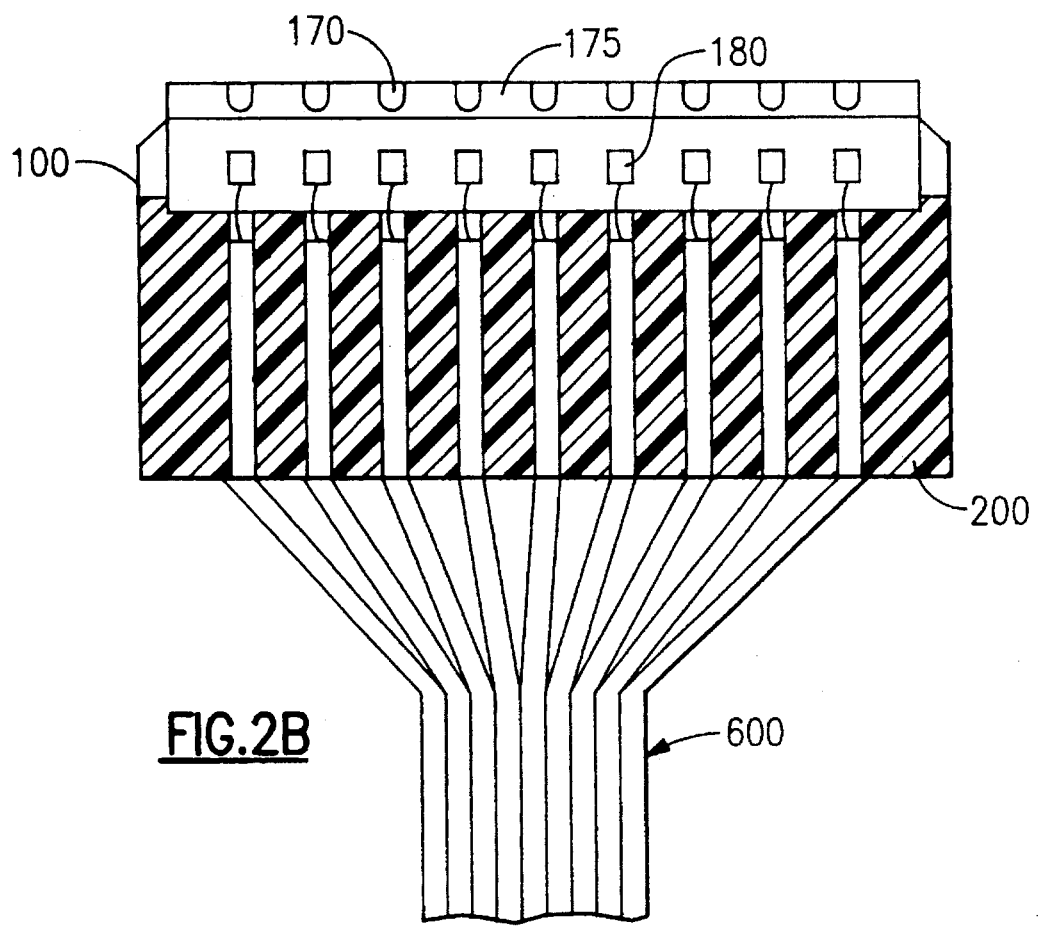
FIG. 2B ilustrates the same embodiment shown in FIG. 2A after the semi-interpenetrating network has been formed and the swelled plug has made contact both with the high speed cables and the connector housing.

FIG. 2B shows the electrical connector assembly of FIG. 2A after the monomer is added and the plug is cured. Connector housing 100 in FIG. 2B also contains a printed circuit board 175 used as an edge connector. FIG. 2B further shows a plurality of high speed cables 600.

Figure 3A:
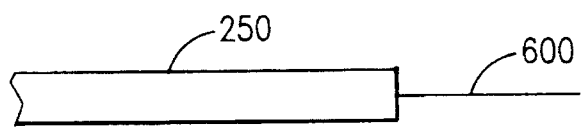
FIG. 3A is a side elevation view of a cable with a swellable jacket.
Figure 3B:
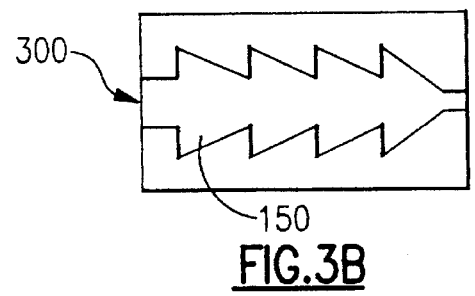
FIG. 3B illustrates a connector housing before the swellable jacket is inserted.
Figure 3C:
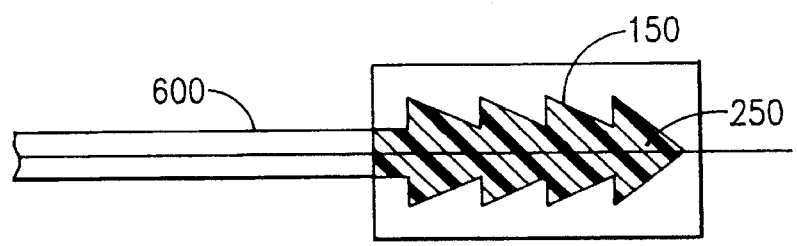
FIG. 3C is a cross sectional side elevation view illustrating the entire assembly with the swellable jacket after the jacket is cured.

FIG. 3 illustrates yet another alternative embodiment of the present invention. FIG. 3A shows a side view of cable 600 having a swellable jacket 250. FIG. 3B shows connector housing 100 before cable 600 is inserted. The Connector housing 100 has hollow center 300 and inside walls 150. FIG. 3C is a cross sectional view of the entire assembly after the semi-interpenetrating polymer jacket 250 is inserted and swelled to touch both the inside walls 150 of the hollow center 300 of connector housing 100 and cable 600.

Figure 4:
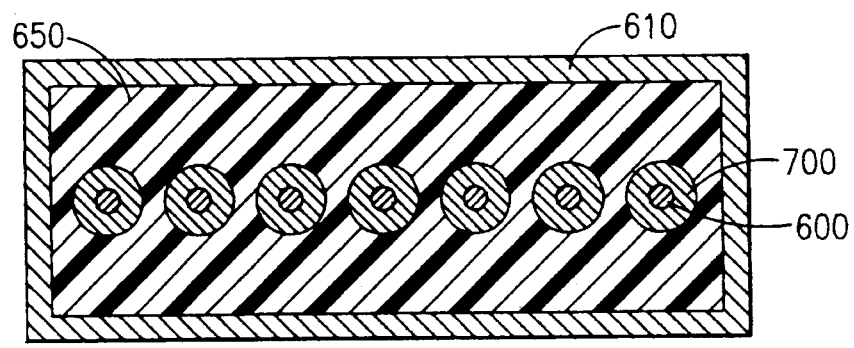
FIG. 4 illustrates an alternate embodiment of the present invention in which multiple electrical connections are disposed in a conductive connector housing.

In a variation, present invention which is particularly applicable to electrical connectors, the use of conductive polymer jacket 600, allows electrical continuity to be achieved between a metal connector housing 610 and metal shield 700 placed on cables 600, as shown in FIG. 4. A conductive polymer plug 650, is used to provide electrical continuity between metal shield 700 and metal connector housing 610.

While the invention has been described in detail herein in accordance with certain preferred embodiments thereof, many modifications and changes therein may be effected by those skilled in the art. Accordingly, it is intended by the appended claims to cover all such modifications and changes as fall within the true spirit and scope of the invention.

Having thus described my invention, what I claim as new and desire to secure by Letters Patent is:

1. A strain relief mechanism for retention of a cable, said mechanism comprising:

a connector housing with a hollow center having inside walls, said housing having an open end and another end which has an aperture through which said cable is disposed;

an undersized polymer plug disposed within said connector housing, said undersized polymer plug being smaller in size than said connector housing's hollow center;

said undersized polymer plug also having an opening for said cable to pass through;

a monomer mixture disposed between said undersized polymer plug and said inside walls of said connector housing as to fill any vacancies surrounding said undersized polymer plug; and said monomer mixture having characteristics so that said monomer mixture interacts with said undersized polymer plug to form a semi-interpenetrating network, causing said undersized polymer plug to swell and fill said hollow center and to press against said cable and said inside walls.

2. The mechanism of claim 1, wherein said cable is an electrical wire.

3. The mechanism of claim 1, wherein said cable used is a fiber optic cable.

4. The mechanism of claim 1, in which said monomer in said monomer mixture is selected from the group consisting of styrene and methacrylate monomers.

5. The mechanism of claim 1, in which said polymer plug is made from an elastomeric material such that said polymer plug is flexible.

6. The mechanism of claim 1, in which said polymer plug is made from a polymer selected from the group consisting of neoprene, nitrile, ethylene propylene diene monomer, and silicone polymers.

7. A method for forming strain relief for cables, said method comprising the steps of:

placing a polymer plug in a connector housing with a hollow center, said connector housing having an open end and another end having at least one aperture through which said cable is disposed, said polymer plug being smaller in size than said hollow center of said connector housing so that a void remains between said polymer and said connector housing;

providing an opening in said polymer plug for said cable to pass through;

inserting a monomer mixture having a crosslinking initiator in the form of a crosslinking agent within said void until said void is completely filled, so as to swell said polymer plug until said polymer plug is in contact with said inside walls of said connector housing's hollow center and with said cable being disposed through said plug.

8. The method of claim 7, wherein said connector housing containing said monomer is placed in a curing chamber, so as to swell said polymer plug completely until said polymer plug is in contact with said inside walls and said hollow center.

9. The method of claim 8, in which said monomer is cured in such a way as to form a three dimensional crosslinked structure, so that said crosslinking agent is not added.

10. A strain relief mechanism for retention of a cable, said mechanism comprising:

a connector housing with a hollow center having inside walls, said housing having an open end and another end which has an aperture through which said cable is disposed;

said connector housing being of an electrically conductive material;

a polymer plug made of a conductive rubber material disposed within said connector housing, and said polymer plug being a semi-interpenetrating network swelled to fill said hollow center and to press against said cable and walls; and said undersized polymer plug also having an opening for said cable to pass through.

11. The mechanism of claim 1, in which said monomer mixture comprises a crosslinking initiator in the form of a crosslinking agent.

* * * * *